July 9, 1963
H. W. CLARKE ETAL
3,096,775
CART WASHING APPARATUS
Filed Sept. 30, 1959
2 Sheets-Sheet 1
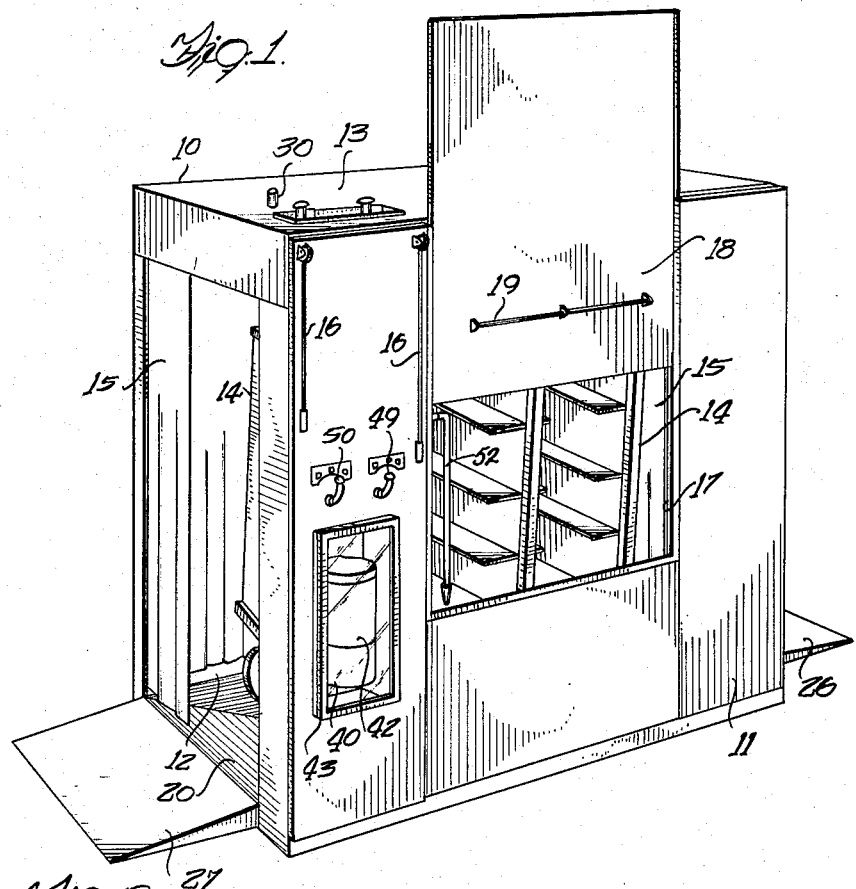
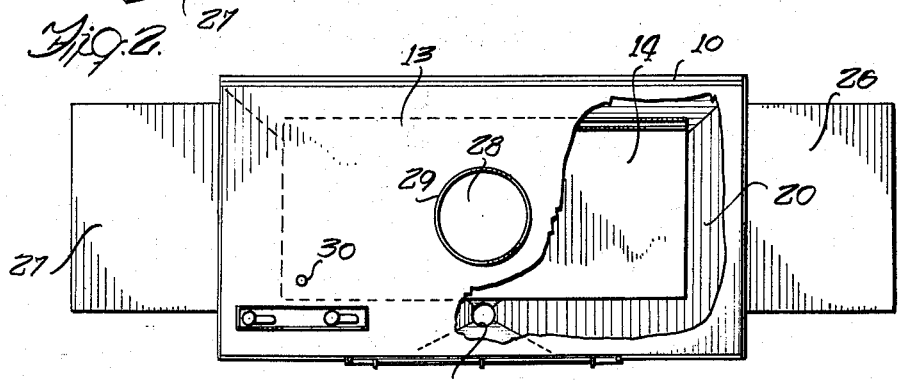
Inventors
Houghton W. Clarke
Floyd A. Blashfield
Dawson, Tilton, Fallon & Lungmus
Attorneys July 9, 1963 H. W. CLARKE ETAL 3,096,775
CART WASHING APPARATUS
Filed Sept. 30, 1959 2 Sheets-Sheet 2
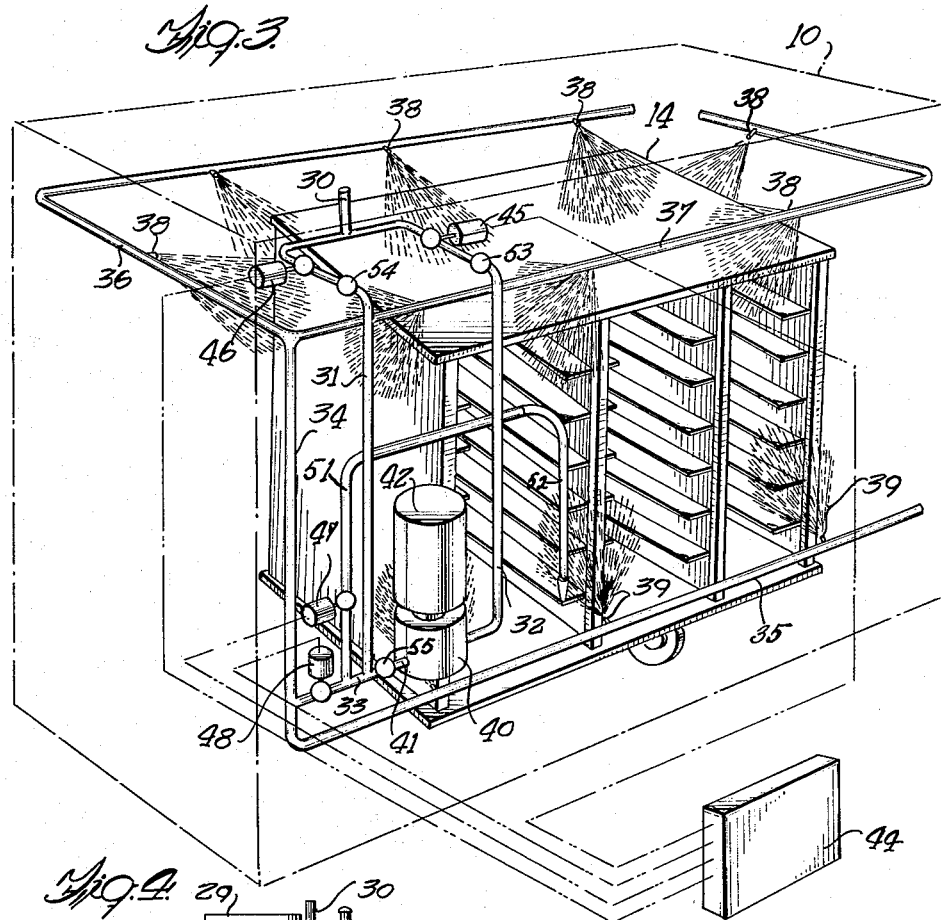
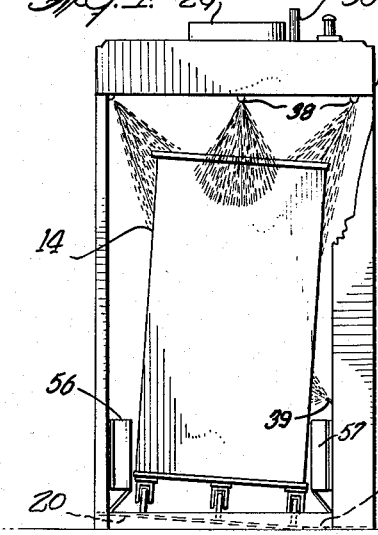
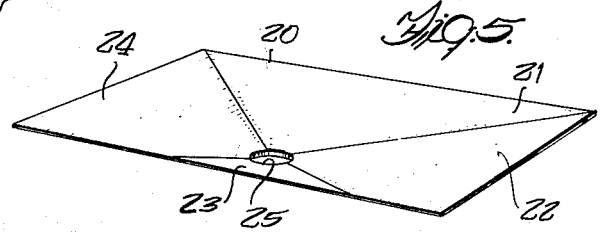
Inventors
Houghton W. Clarke
Floyd A. Blastyjeld
Dawson, Tilton, Fallon & Lungmus
Attorneys

United States Patent Office 3,096,775
Patented July 9, 1963

3,096,775
CART WASHING APPARATUS
Houghton W. Clarke, Wonder Lake, and Floyd A. Blashfield, Evanston, Ill., assignors, by direct and mesne assignments, of ninety-nine percent to Mealpack Corporation, Evanston, Ill., a corporation of Illinois, and one percent to Houghton W. Clarke
Filed Sept. 30, 1959, Ser. No. 843,531
1 Claim. (Cl. 134—123)

This invention relates to an apparatus for washing carts and other wheeled vehicles, and more specifically, to an apparatus particularly suited for washing and sanitizing food-carrying carts of the type used in hospitals and other institutions.

For many years hospitals and related institutions have faced costly and uncertain methods of properly washing and sanitizing tray carts used for delivering food trays to bed patients. In the delivery of trays to patients, such tray carts often traverse contaminated hospital areas. They are also used in collecting soiled trays after patients have eaten and in returning such trays to the main kitchen area for proper washing, storage and re-use. Thus, it is apparent that if adequate steps are to be taken to eliminate the possibilities of crosss contamination from portable equipment operated between the patient floors and the central food preparation area of a hospital, such steps must include thorough cleaning and sanitizing of the carts used in transporting food trays.

In the past, food tray carts have been washed by hand. Such hand washing methods are both arduous and costly for adequate cleaning, especially with the enclosed or partially enclosed tray carts now in common use. Innumerable corners, crevices and inaccessible areas make thorough cleaning and sanitizing virtually impractical by hand methods. Furthermore, in view of the fact that the human element for such operations is difficult to supervise and control, even if an operator spends the time and effort necessary to clean effectively a particular food-delivery tray cart, there is no positive assurance that other carts will receive the same thorough treatment or that other operators will take the same degree of care.

Accordingly, it is a principal object of the present invention to provide an apparatus for overcoming the aforementioned disadvantages and possible dangers arising from the hand washing of food-delivery tray carts. Another object is to provide an apparatus for accomplishing both thorough external and internal washing of such tray carts and for applying a germicidal rinse to the surfaces of such carts, both operations being automatically controlled as to required water pressures, temperatures and the proper time cycles for the washing, rinsing and sanitizing steps. A still further object is to provide an apparatus for thoroughly cleansing a tray cart and for thereafter applying a thin germicidal film to the surfaces thereof.

Other objects will appear from the specification and drawings in which:

FIGURE 1 is a perspective view of a cart washing apparatus embodying the present invention, the apparatus being shown with a cart disposed therein;

FIGURE 2 is a top plan view of the structure shown in FIGURE 1, the cabinet being partially cut away to illustrate structural details thereof;

FIGURE 3 is a somewhat diagrammatic perspective view illustrating the liquid distributing system of the apparatus, the structure being shown in the operation of washing a tray cart;

FIGURE 4 is an end elevational view of the washing apparatus showing the orientation of a cart therein during a washing operation; and FIGURE 5 is a perspective view illustrating the floor construction of the cart washing apparatus.

Referring to the drawings, the numeral 10 generally designates a cabinet or enclosure having front, rear and top walls 11—13 respectively. In the illustration given, both ends of the enclosure are open so that a vehicle such as the tray delivery cart 14 shown in FIGURES 1–4 may be moved in one direction through the enclosure. Suitable closure means are provided for the end openings and, in the embodiment shown in the drawings, we provide draw curtains 15 which may be opened and closed at each end of the enclosure by manipulating the draw cords 16 of spring-loaded curtain-supporting structures. It will be understood, of course, that other types of closure means may be provided and that such closure means may be operated electrically or automatically if such operation is desired.

The front wall 11 of the enclosure may be provided with an enlarged rectangular opening 17 provided with a vertically slidable closure element or door 18. The door is equipped with a handle 19 and is counter-balanced or is provided with some conventional restraining means so that it will not slide downwardly by reason of its own weight when it has been lifted into the elevated position shown in FIGURE 1. While the enclosure generally is formed from a durable material such as stainless steel, door 18 may, if desired, be formed from glass or a suitable transparent plastic material.

Enclosure 10 is also provided with a bottom wall or floor 20 which slopes laterally with reference to the direction of travel of a cart through the enclosure or, more specifically, slopes downwardly and forwardly from the rear side wall 12 to the front side wall 11. Thus, when a cart 14 is disposed within the enclosure, it is tipped laterally towards the front wall as illustrated most clearly in FIGURE 4. With reference to FIGURE 5, it will be seen that the floor 20 is actually made-up of four sections 21—24 all of which slope towards a drain opening 25 located adjacent the enclosure's front wall and disposed intermediate the open ends of that enclosure. The several sections may be integrally formed from a single sheet of material, the largest of the triangular sections (section 21) being responsible for the principal inclination or slope of the floor. The smaller end sections 22 and 24 have their end edges horizontally disposed and have the upper surfaces of their end portions in flush relation with the upper surfaces of ramps 26 and 27.

Top wall 13 is provided with a central opening 28 and the collar 29 defining that opening is adapted to be connected to a suitable exhaust duct for the withdrawal of steam and water vapor from the cabinet when the apparatus is in operation. The stem of a hot water inlet pipe 30 also projects upwardly through the top wall, as shown most clearly in FIGURES 1 and 2, and is adapted to be connected to a suitable source of hot water under pressure.

The hot water inlet pipe 30 communicates and is part of a fluid distributing and spraying system illustrated somewhat diagrammatically in FIGURE 3. There it will be seen that the inlet pipe merges at its lower end with two conduits or pipes 31 and 32. Pipe 31 extends forwardly and then downwardly and communicates at its lower end with manifold pipe 33. The manifold pipe in turn communicates through vertical conduit 34 with lower spray pipe 35 and upper spray pipes 36 and 37. The upper spray pipes are each L-shaped in configuration and together extend horizontally about substantially the entire inner perimeter of the enclosure at a selected distance below the top wall thereof. A plurality of downwardly and inwardly directed spray nozzles 38 are spaced apart along the end and side legs of the L-shaped spray pipes 36 and 37 for forceably directly hot cleansing or rinsing liquid against all of the external surfaces of a cart 14 disposed within the enclosure. The lower horizontal spray pipe 35 extends along the inner surface of the front wall above floor 20 and is similarly provided with a plurality of spray nozzles 39. As shown in the drawing, spray nozzles 39 are angled to direct fluid upwardly and inwardly and, together with the nozzles 38 provided by the front leg of upper spray pipe 37, direct hot cleansing or rinsing liquid into the interior of cart 14 and against all of the inner surfaces thereof.

Pipe 32 extends downwardly and communicates at its lower end with a metering device 40 for discharging measured amounts of a liquid sanitizing agent into the hot water flowing therethrough. As will be seen from FIGURE 3, the outlet 41 for the metering device communicates with manifold 33 so that water into which a sanitizing agent has been injected may then be distributed through the system and sprayed through nozzles 38 and 39. The sanitizing agent may be contained in an inverted bottle 42 which communicates with the metering device and, as illustrated in FIGURE 1, the bottle and metering device are preferably disposed at the front of the enclosure behind a hinged glass or transparent plastic door 43 so that an operator may readily estimate the supply of sanitizing agent for use in the apparatus.

The sanitizing agent may be any of a variety of well-known water-soluble germicides which are non-toxic and non-irritating and which are capable of leaving a thin protective film or residue upon a surface after the water solvent has evaporated. "Mikro-Klene DF," an iodine-type sanitizing agent, sold by Economic Laboratory, Inc. of St. Paul, Minnesota has been found particularly effective as a sanitizing agent for use in connection with the present invention. However, other chemicals such as thymol and its condensation products, dihydroxyacetic acid, hexylresorcinol, chlorinated phenol compounds, and other well-recognized disinfectants might also be used.

The washing and rinsing system also includes means for automatically controlling the duration of the spraying cycles to insure proper cleaning and sanitizing of each cart. Such means are represented diagrammatically in FIGURE 3 by timer and control box 44 in electrical circuit with solenoid-controlled valves 45, 46, 47, and 48. Box 44 is located behind the front wall or panel 11 of the apparatus and the electrical timing and controlling devices contained therein are actuated by two levers 49 and 50 shown in FIGURE 1. Lever 50 may be moved between any of three positions for selectively controlling the operation of the spraying system. In the illustration given, lever 50 points upwardly and is an "off" position with solenoid valves 45 and 46 in closed condition. By moving the lever to the left, an operator may start a timed wash cycle. Solenoid valve 45 remains closed but valves 46 and 48 are electrically opened to permit hot water to flow through inlet pipe 30, pipe 31, manifold pipe 33, conduit 34 and spray pipes 35, 36 and 37. The duration of the wash cycle is automatically controlled by the electrical timer and may range between 30 to 90 seconds. It has been found that a wash cycle duration of approximately 45 seconds is sufficient to insure effective washing of all external and internal surfaces of an ordinary tray delivery cart and that food particles are effectively dislodged or dissolved in that period of time by the forceful sprays of hot water impinging on the cart.

At the conclusion of the washing cycle, the operator simply urges lever 50 to the right to start the timed rinsing cycle. With the lever in the right hand position, the electrical controls 44 actuate the solenoid of valve 45 to open that valve while at the same time closing valve 46. Hot water therefore flows through pipe 32 and into the metering device 40 where the sanitizing agent is injected into the water. The water and sanitizing agent then pass into the manifold pipe 33 and are distributed through the spray system in the same manner as described in connection with the distribution of wash water.

Throughout the washing and rinsing operations described above, solenoid valve 48 remains open and solenoid valve 47 is closed. The operation of these two valves is controlled by lever 49 and the electrical unit 44, valve 48 being open and valve 47 being closed when the lever arm 49 is in a left hand position. When the lever 49 is vertically disposed, both of the solenoid valves 47 and 48 are closed and when the lever points toward the right valve 48 is closed while valve 47 is open. In this latter condition, fluid flows from manifold pipe 33 through conduit 51 to a flexible nozzle-equipped hose 52. The hose is readily accessible to an operator upon lifting of door 18 (FIGURE 1). While use of the hose to wash an article within the enclosure is not ordinarily necessary, such an operation may be desirable for washing and rinsing vehicles of unusual or highly irregular shapes.

The distribution system for water or water and a sanitizing agent also includes safety valves 53, 54 and 55 which permit the flow of liquid only in one direction therethrough and which therefore eliminate any possibility of contamination arising from the backflow of liquid in the system. Since the construction and operation of such one-way valves, as well as the construction and operation of solenoid valves 45—48 and the switches and timers of unit 44, are well-known in the art, description of these components in greater detail is believed unnecessary herein.

An important aspect of the present invention lies in the fact that a cart within the enclosure 10 is supported in tipped or tilted condition during the washing and sanitizing cycles. During the washing cycle, the hot wash water impinging on the internal and external surfaces of the cart quickly drains off the inclined surfaces to insure the removal of loosened or dissolved matter and contaminated water. Near the end of the washing cycle, only clean hot water flows off of the inclined surfaces, thereby preparing the cart for the important final rinsing and sanitizing cycle. Finally, at the conclusion of the rinsing cycle, the hot rinse water and sanitizing material drains from the surfaces of the cart leaving a thin protective film of the sanitizing agent upon such surfaces. Therefore, the inclination of the cart not only assists in the removal of foreign particles from the cart's surfaces but also promotes the formation of a protective germicidal film upon such surfaces.

To assist in locating the cart in proper position within the enclosure, bumpers or guide members 56 and 57 may be provided along the front and rear sides within the enclosure.

From the foregoing, it is believed apparent that the present invention involves a method for effectively and uniformly washing and sanitizing carts such as the tray-delivery carts used in hospitals. After supporting such a cart in tipped condition, hot water is sprayed over all of the internal and external surfaces thereof to wash away foreign matter. Since the duration of the washing cycle is automatically controlled, each cart will necessarily be subject to the same thorough cleansing. After the timed wash cycle is completed, the internal and external surfaces of the cart are rinsed with the hot solution containing the germicidal agent and, since the cart remains in tipped condition during the rinsing cycle, the rinse solution drains over the inclined surfaces to promote the formation of a thin residual protective film. While the temperature of the water during the washing and rinsing cycles may vary somewhat within the range of 120 to 200° F., it is preferable to provide water temperatures in the upper part of this range to increase the effectiveness of the washing and sanitizing operation.

While in the foregoing we have disclosed an embodiment of this invention in considerable detail for purposes of illustration, it will be understood by those skilled in the art that many of these details may be varied considerably without departing from the spirit and scope of the invention.

We claim:

A cart washing, rinsing and draining apparatus comprising a cabinet having at least one open end and having top and side walls, said cabinet also having a floor extending horizontally immediately adjacent said open end and being inclined gradually downwardly away from said opening and one of said side walls for supporting a cart in tipped condition therein, a plurality of perimetrically spaced and inwardly directed spray nozzles within said cabinet, said nozzles being spaced along substantially the entire length of at least one of said side walls adjacent the top and bottom thereof, fluid passage means communicating with said nozzles to distribute hot liquid and a sanitizing agent under pressure to said nozzles for washing, rinsing and sanitizing said cart, whereby said cart is supported in tipped condition to facilitate the removal of dislodged and dissolved foreign material from the surfaces thereof.

References Cited in the file of this patent

UNITED STATES PATENTS

| | | |
|---|---|---|
| 774,279 | Seabury | Nov. 8, 1904 |
| 870,766 | Eaton | Nov. 12, 1907 |
| 1,276,659 | Jensen | Aug. 20, 1918 |
| 2,140,896 | Bruce | Dec. 20, 1938 |
| 2,255,493 | Pfalzgraff | Sept. 9, 1941 |
| 2,290,286 | Leckie | July 21, 1942 |
| 2,551,379 | Raus | May 1, 1951 |
| 2,600,221 | Domingo | June 10, 1952 |
| 2,619,099 | Young | Nov. 25, 1952 |
| 2,671,241 | Starner | Mar. 9, 1954 |
| 2,706,990 | Lyman | Apr. 26, 1955 |
| 2,718,481 | Tuthill | Sept. 20, 1955 |
| 3,010,461 | Faust | Nov. 28, 1961 |

FOREIGN PATENTS

| | | |
|---|---|---|
| 62,088 | France | Dec. 22, 1954 |
| | (1st addition to Patent 1,051,333) | |